INVENTOR.
GORDON E. BROOMHALL,
BY Walter R. Thiel
AGENT.

3,164,746
SWEEP PROTECTION CIRCUIT
Gordon E. Broomhall, Escondido, Calif., assignor to Hughes Aircraft Company, Culver City, Calif., a corporation of Delaware
Filed July 2, 1962, Ser. No. 206,877
3 Claims. (Cl. 315—20)

This invention relates to improved protection circuits for use with electron discharge devices such as a cathode ray tube and in particular to an improved circuit means for preventing damage to the sensitive luminescent screen of the discharge device upon reduction in potential of the energizing source for the electron beam deflection members.

Cathode ray tube protection circuits have been employed to prevent damage to the phosphor of television kinescopes, or oscilloscopes when either the horizontal slow sweep or the vertical fast sweep voltages fail. The failure of either continuous sweep signal causes the electron scanning beam to be deflected along one axis producing a single line on the luminescent screen. If the beam current is sufficiently large and if a sufficiently high accelerating voltage is applied to the anode of the cathode ray tube this line will be burned into the screen phosphor and will produce a blemish. This problem is particularly acute during the aging process of the phosphor surface of the viewing screen. To properly age the phosphor surface it is continuously scanned for many hours by an electron beam of uniform intensity. Because of the necessity that this process be carried on over a continuous time interval, often longer than 24 hours, it is necessary to provide in the scanning circuit a means to detect automatically the loss of the sweep voltage.

The necessity for automatically and rapidly detecting the loss of the fast sweep voltage is not as critical as detecting the loss of the slow sweep voltage because the fast sweep voltage causes the electron beam to move at such a speed that a decrease in this voltage will not as readily cause a blemish on the phosphor screen. One prior art method to detect the loss of the fast sweep voltage is to use a rectification and filtering circuit to develop a D.C. voltage proportional to sweep amplitude to operate a control device or circuit. However, such a circuit cannot be effectively utilized to detect the loss of the horizontal speed voltage of the order of one sweep per second because it requires a large filter of from 10 to 20 seconds time constant which would inherently have a very slow response to a loss in sweep or a reduction in sweep amplitude.

Another prior method used to prevent damage to the sensitive luminescent screen of a cathode ray tube senses any change in potential of the energizing source for the electron beam deflection circuit and uses this information to activate a protective circuit. While this method does protect against changes in the potential of the energizing source for the sweep voltage generator it does not protect against changes in the sweep voltage itself.

Therefore, one object of the present invention is to provide means for automatically and rapidly protecting the viewing screen of an electron discharge device when the maximum amplitude of the horizontal sweep deflection voltage drops below a predetermined level.

A further object of the present invention is to provide an improved protection circuit for cathode ray tubes to prevent blemishes on the highly sensitive phosphor screen by disabling the high voltage anode supply when the maximum amplitude of the slow sweep deflection voltages drops below a predetermined level.

A still further object of the present invention is to provide an improved protection circuit for cathode ray tubes to prevent blemish or damage to the phosphor screen of the tube during the aging process thereof when the maximum amplitude of the slow sweep deflection voltage drops below a predetermined value.

In general, in its preferred form, the present invention comprises in combination with a cathode ray tube including a high voltage circuit and a slow sweep voltage generator a protection circuit comprising means to obtain a signal representative of the maximum amplitude of the slow sweep voltage and means to disable the high voltage circuit of the cathode ray tube when said signal drops below a predetermined level.

Other advantages of the invention will hereinafter become more fully apparent from the following description of the drawings which illustrate a preferred embodiment, wherein FIGURE 1 is a schematic circuit diagram and a block diagram illustrating a preferred embodiment of the present invention as applied to a cathode ray tube;

Figure 1:
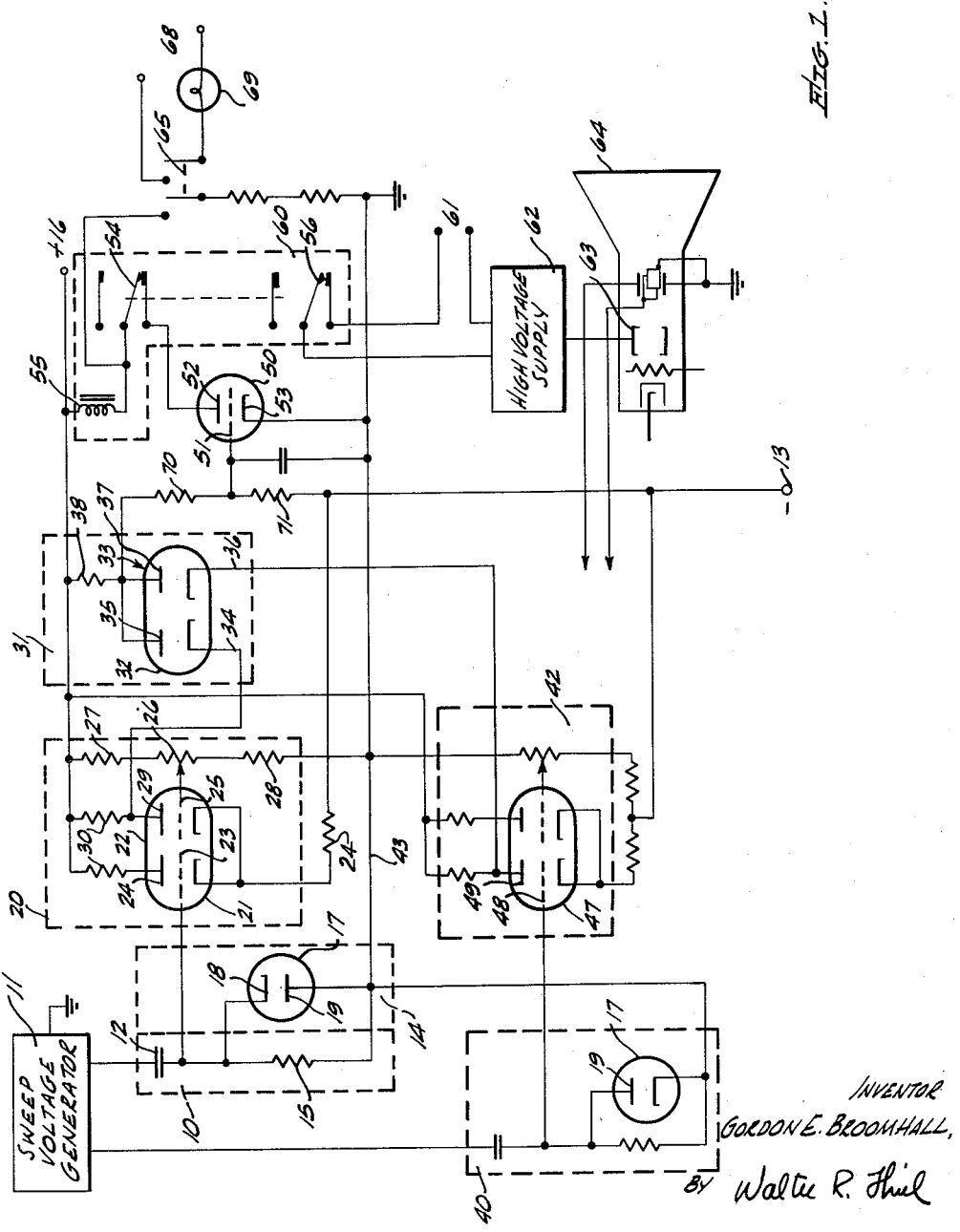
Figure 2:
FIG. 2 is a graph showing the waveform of the positive polarity sawtooth voltage output of the sweep voltage generator.
Figure 3:
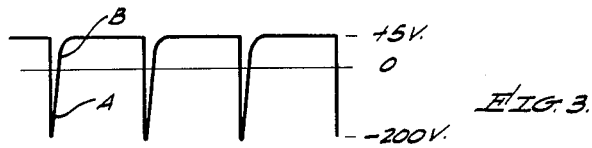
FIG. 3 is a graph showing the waveform of three cycles of the voltage output of the differentiating circuit.

Referring now to FIG. 1 a differentiating circuit 10 comprising a capacitor 12 and a resistor 15 connected in series relation between the positive terminal of a sweep voltage generator 11 and a point of fixed reference potential such as ground. The sweep voltage generator 11 may be a conventional slow sweep sawtooth voltage generator, such as a Model 162 manufactured by Tektronix, Inc., having a typical output voltage waveform as shown in FIG. 2. The output of the differentiating circuit 10 is applied to the control grid 23 of a first triode electron discharge device 21 forming part of a voltage amplifier and comparator circuit 20 illustrated here as one-half of a dual triode which is typically of a 12AX7 type. Typically, the value of the capacitor 12 and resistor 15 are chosen to provide a relatively short time constant RC coupling network compared to the sweep time of the order of 1 second wherein the capacitor 12 has a value of 0.2 microfarad and the resistor 15 a value of 1 megohm, and in addition to provide, as shown in FIG. 3, in each cycle of the differentiated waveform, a first portion A of negative polarity typically of a magnitude of approximately 200 volts relative to ground and a second portion B of a positive polarity typically of a magnitude substantially less than the said first portion A and in the order of 5 volts relative to ground.

The anodes 24, 29 of each of the dual triodes 21, 22, respectively, are supplied with an operating potential from a terminal 16 through a load resistor 30 and the cathode of each is supplied with a negative potential with respect to ground from a terminal 13 through a common resistor 24. The source of potential may be a battery or power supply coupled with the terminals 13 and 16 and ground to provide proper voltages. The control grid 25 of the second triode 22 of the dual triode is coupled to a variable resistor 26 such as a conventional potentiometer for sensitivity control of the point of operation of the protection circuit. The potentiometer 26 is part of a voltage dividing network connected between the positive terminal 16 and ground including as well as potentiometer 26, resistors 27 and 28.

Figure 4:
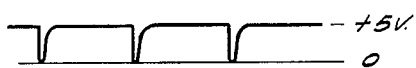
FIG. 4 is a graph showing the waveform of three cycles of the voltage output of the clipping circuit.

As shown in FIGS. 1 and 4 only the positive portion of the differential signal is applied to the control grid 23 since the negative first portion A of the differentiated waveform is held at ground potential by means of a shunting or clamping circuit 14 including an electron discharge device 17 which is typically a diode, such as a 6AL5 type, having an anode 19 and a cathode 18 is coupled between the differentiating circuit 10 and ground.

In normal operation the second triode 22 is biased below its cutoff point through the adjustment of the potentiometer 26 and the first triode 21 is biased to render it conductive through the time interval of the second portion B of the differentiated waveform. Thus, as long as the magnitude of the positive second portion B remains unchanged the second triode 22 remains conductive; however, if the magnitude of the positive slow sawtooth voltage generated by the sweep generator 11 decreases the magnitude of the positive second portion of the differentiated waveform also decreases resulting in a reduction in the positive biasing potential on the control grid 23 and a corresponding reduction in the conduction of the first triode 21 to increase the negative potential of the cathode of the second triode 22 sufficiently to render it conductive.

Coupled to the anode 29 of the second triode 22 is a cathode 34 of an electron discharge device 32 illustrated as a dual diode typically of a 6AL5 type and including an anode 35. When the second triode 22 is a nonconducting state, that is the sweep generator output is normal, both the anode 35 and the cathode 34 are substantially at the same potential, each being at the potential of the terminal 16. When the second triode 22 is rendered conductive, the potential of the anode 29 and the cathode 34 is reduced thereby initiating conduction in the diode 32 which in turn results in reducing the potential of the anode 35 due to the voltage drop across a load resistor 38.

The signal developed between the negative terminal of the sweep voltage generator 11 and ground is in a similar manner applied to the control grid 48 of a second comparator circuit 42 through a second differentiating circuit 40. The differentiating circuit 40 and comparator circuit 42 are identical in arrangement and operation to those above described. However, in this instance a clipping circuit 41 includes an electron discharge device 17 shown as a diode except poled so that the substantially larger positive portion of the differentiated waveform is shunted to ground. Accordingly, the anode 19 of the diode 17 is connected to the control grid 48 and the cathode is connected to ground. The first triode 47 therefore is biased to cut off during the negative portion of the differentiated signal.

Since the first triode 47 is biased just below its cutoff point by the negative voltage on the control grid 48 any decrease in the magnitude of this voltage, that is if this voltage becomes less negative because of a decrease in the magnitude of the negative portion of the sweep voltage, renders it conductive and decreases the voltage on the anode 49 and the cathode 36 coupled to it placing the second diode 33 in a conductive state and decreasing the voltage of the anode 37.

The first and second diodes 32 and 33 and the load resistor 38 form an "and" gate or gating circuit 31 wherein the anodes 35 and 37 are connected in common to the load resistor 38 which in turn is connected to the terminal 16. Also connected between the anode 37 and the terminal 13 is a voltage dividing network including the series arrangement of a pair of resistors 70 and 71 each of a large resistance value preferably in the order of from 10 to 15 megohms. The intermediate point of the two resistors 70, 71 is connected to the control grid 51 of an electron discharge device 50 shown here as a triode typically of a 12AU7 type which includes an anode 52 and a cathode 53 connected to ground. The anode 52 is supplied with an operating potential from the terminal 16 through a coil 55 and a first set of contacts 54 of a normally closed relay 60 which includes a second set of contacts 56 connected in series with a supply voltage 61, such as 120 volts A.C. for a conventional high voltage supply generator 62 for the accelerating electrodes 63 of a typical cathode ray tube 64. Since the control grid 51 is maintained at a positive potential through the resistors 38 and 70, the triode 50 is in a normally conductive state. This permits current to flow from the terminal 16 to ground through the path provided by the coil 55, the first set of contacts 54, which are held closed by the coil 55, and the triode 50. As long as the triode 50 remains conductive the relay remains closed; however, if the biasing potential on the control grid 51 is reduced below the cutoff value of the triode 50 the conduction ceases and the path from the terminal 16 to ground is broken and the contacts of the relay 60 open.

The term "and" gate is used in the computer art to define a circuit which includes two input voltages and has the characteristics of a single high output voltage only when both of the input voltages are high but if either of the input voltages are substantially low relative to the high input voltage value then the output voltage is low. As long as both the diodes 32 and 33 are in a nonconductive state the voltage between the terminals 16 and 13 is divided in accordance with the resistance values of the series resistors 38, 70, and 71, and the control grid 51 is at a potential equivalent to the arithmetic sum of the voltage developed across the resistor 71 and the voltage between the terminal 13 and ground. If either or both of the diodes 32 and 33 are conducting, then most of the voltage drop between the terminals 16 and 13 exists across the resistor 38 because the resistance of the series combination of the resistors 70, 71 is much larger than the resistance of the series combination of either diode and its respective triode section of either comparator circuit, which latter combination is in parallel with the series arrangement of resistors 70 and 71. This places a potential on the control grid 51 sufficient to bias the diode 50 to cutoff thereby opening the relay contacts 54 and 56.

In normal operation, the cathodes 34 and 36 remain at a sufficiently positive potential to cut off the conduction in each diode and the triode 50 remains conductive to hold the relay 60 closed. However, if the magnitude of either the positive or negative sawtooth voltages generated by the sweep generator 11 should decrease then the respective cathode of the dual diode will decrease in potential through the operation of the respective differentiating, clipping and comparator circuits coupled thereto to render the triode 50 conductive and cut off the triode switch 50 to deactivate the relay 60 and open the contacts 54 and 56. Since the contacts 56 are connected to the high voltage supply generator 62 for the acceleration anode 63 of a cathode ray tube 64 when the contacts are open the voltage supply is interrupted and the potential on the anode 63 collapses to prevent the high acceleration of the electrons emitted by the electron gun of the cathode ray tube thereby preventing the electrons from impinging at a high velocity on the storage surface of the cathode ray tube.

To reset the relay 60 after it has been deactivated a normally open single pole double throw lockout switch 65 is operated to shunt the protection circuits by connecting one side of the coil 55 to ground. This also connects a source of potential 68 such as 120 volts A.C. to a visual indicating means 69 shown typically as a light bulb to prevent a careless operator from leaving the lockout switch engaged.

I claim:
1. In combination with a cathode ray tube including an accelerating electrode, a sweep voltage generating means, having a slow sweep output voltage including a pair of waveforms of opposite polarity and a high voltage supply for said accelerating electrode, said protection circuit comprising:
   a pair of differentiating means each connected to said slow sweep voltage generating means to receive a different one of said waveforms and to differentiate each of said waveforms to produce waveforms including in each cycle thereof a first portion and a second portion of less magnitude than said first portion;
   a pair of electron discharge means each connected to a different one of said differentiating means and controllable by the second portion of said waveforms to vary the degree of conduction when the maximum amplitude of the second portion of said waveform drops below a predetermined value;

control means coupled with each of said electron discharge means, including a pair of electron discharge devices each nonconductive when the maximum amplitude of the second portion of a different one of the differentiated waveforms is above a predetermined level and conductive when the maximum amplitude of the second portion of a different one of said differentiated waveforms is below a predetermined level;

and switch means included in said control means, and coupled with said electron discharge devices to disconnect said high voltage supply from said accelerating electrode when either of said electron discharge devices is conducting, whereby the high voltage supply for said cathode ray tube is disabled.

2. In combination with a cathode ray tube and a sweep voltage generating means, including a slow sweep output voltage having a pair of waveforms of opposite polarity, a protection circuit comprising:

a pair of differentiating means connected to said sweep voltage generating means each to a different one of said waveforms of said slow sweep voltage to produce waveforms including in each cycle thereof a first portion and a second portion of less amplitude than said first portion;

a pair of electron discharge means each connected to a different one of said differentiating means to be controlled by the second portion of a different one of said waveforms to vary the conduction thereof when the maximum amplitude of said second portion drops below a predetermined level;

gating means including a pair of electron discharge devices each connected to a different one of said electron discharge means to receive the output voltage therefrom, said gating means being adapted to develop one voltage output when either of the output voltages of the electron discharge devices drops below a predetermined level and a second voltage output when both of the output voltages of said electron discharge devices are above a predetermined level;

and switch means including an electron discharge device connected to said gating means to disable the cathode ray tube when the maximum amplitude of either of said slow sweep voltage waveforms drops below a predetermined value.

3. A protection circuit for a cathode ray tube including a high voltage circuit comprising:

a slow sweep voltage generator to supply a pair of opposite polarity voltages having a sawtooth waveform;

a pair of RC networks connected between said generator means and ground to differentiate each of said sawtooth voltages to produce a pair of waveforms having in each cycle thereof a first portion of one polarity and a second portion of another polarity of substantially less amplitude than said first portion;

a pair of triodes each connected to a different one of said RC networks and controllable by the second portion of a different one of said waveforms to vary the output thereof when the maximum amplitude of the second portion of said waveform drops below a predetermined value;

gating circuit means including a pair of diodes each receiving the output voltage from a different one of said triodes to develop one voltage output when either of the output voltages of said triodes drops below a predetermined level and a second voltage output when both of the output voltages of said triodes are above a predetermined level;

and switch means including an electron discharge device connected to said gating circuit means to disable the high voltage circuit of said cathode ray tube when the maximum amplitude of either of said slow sweep voltage waveforms drops below a predetermined level.

References Cited in the file of this patent
UNITED STATES PATENTS
2,577,848    Greenleaf et al. _____ Feb. 16, 1950

UNITED STATES PATENT OFFICE
CERTIFICATE OF CORRECTION

Patent No. 3,164,746 January 5, 1965

Gordon E. Broomhall

It is hereby certified that error appears in the above numbered patent requiring correction and that the said Letters Patent should read as corrected below.

Column 1, line 51, for "senstive" read -- sensitive --; column 3, line 7, for "conductive" read -- nonconductive --; column 5, line 25, after "to" insert -- differentiate --.

Signed and sealed this 23rd day of November 1965.

(SEAL)
Attest:

ERNEST W. SWIDER
Attesting Officer

EDWARD J. BRENNER
Commissioner of Patents